June 8, 1965 J. A. MISCOVICH 3,188,009
VARIABLE SPRAY NOZZLE
Filed April 26, 1962 2 Sheets-Sheet 1
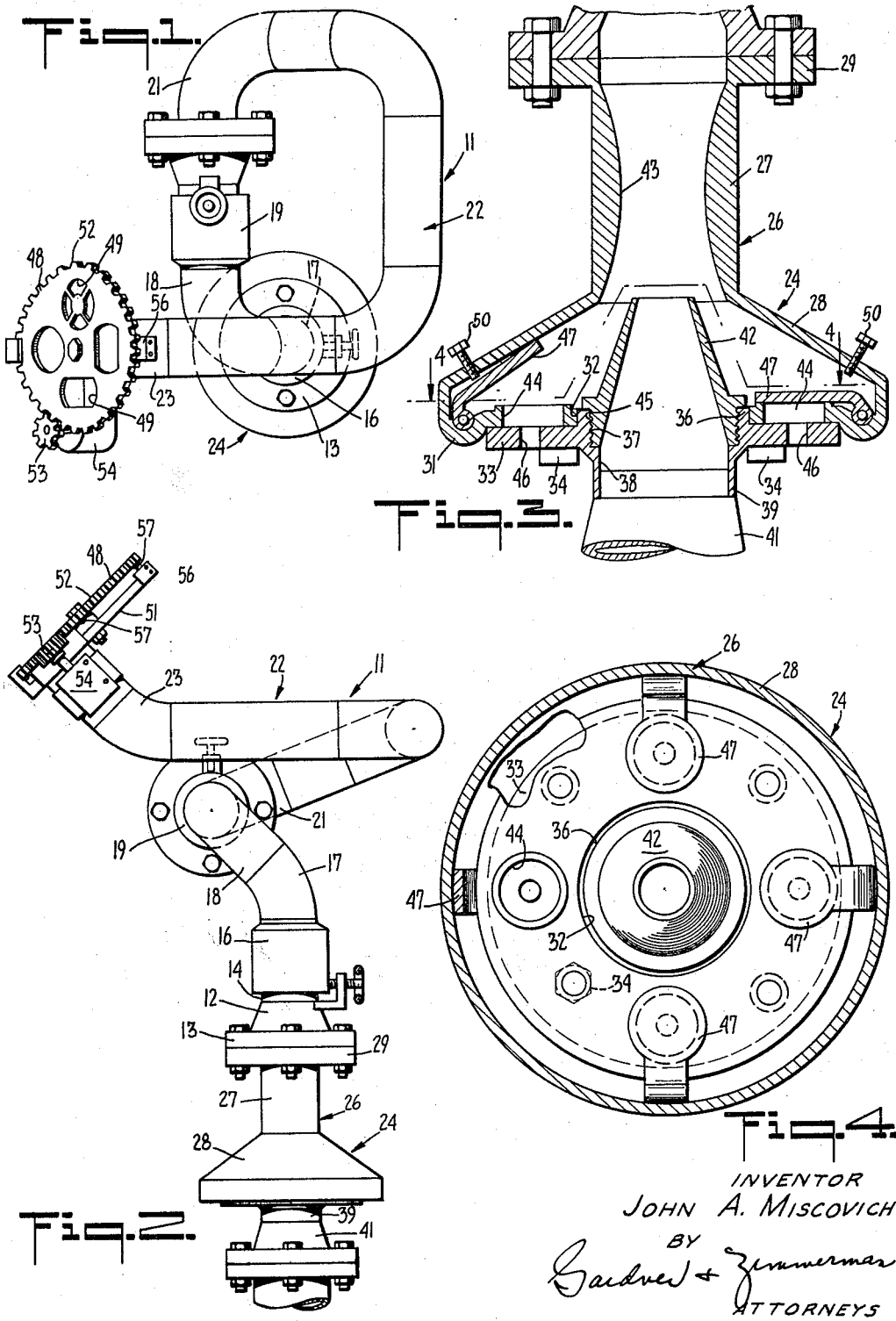
INVENTOR
JOHN A. MISCOVICH
BY
Gardner + Zimmerman
ATTORNEYS June 8, 1965  J. A. MISCOVICH  3,188,009
VARIABLE SPRAY NOZZLE
Filed April 26, 1962  2 Sheets-Sheet 2

INVENTOR
JOHN A. MISCOVICH
BY
Gardner & Zimmerman
ATTORNEYS

United States Patent Office 3,188,009
Patented June 8, 1965

3,188,009
VARIABLE SPRAY NOZZLE
John A. Miscovich, Flat, Alaska, assignor, by direct and mesne assignments, to John W. Stang Corporation, Bell, Calif., a corporation of California
Filed Apr. 26, 1962, Ser. No. 190,413
13 Claims. (Cl. 239—407)

This invention relates to nozzles capable of producing slurry streams or other liquid mixtures having constituents which are mixed in predetermined proportions, and is particularly directed to such a nozzle wherein the proportion of one constituent of the slurry discharged therefrom is automatically controlled in a predetermined relation to the volume and velocity of another constituent of the slurry passing through the nozzle.

Various nozzles exist for mixing several constituents and discharging the resultant mixture in the form of a slurry spray. One particularly advantageous application of such nozzles is in the production of expanded foam sprays for combating various oil and chemical fires. In such nozzles a high pressure stream of water containing a chemical foam material is mixed with air to produce a slurry stream wherein the water and foam solution is expanded to many times its original volume. It is of course desirable that the maximum possible expansion of the particular foam be produced in the nozzle in order that a minimum amount of liquid foam is required in the formation of a given volume of expanded foam stream. In other words where the liquid foam expands by a factor much less than its rated maximum, an increased amount of liquid foam is uneconomically consumed in the formation of the foam spray.

In order that complete expansion of the foam occur it is necessary that the amount of air be controlled in proper proportion to the velocity and volume flow of the water and liquid foam mixture. In addition it is necessary that the air be will mixed with the water and liquid foam prior to discharge from the nozzle. Unfortunately existing foam nozzles do not provide for control of the air in accordance with variations in the liquid flow such that proper proportions conducive to full foam expansion will at all times be maintained. In addition, as soon as the air, foam, and water mixes in these existing nozzles, the mixture blurps out the discharge end whether completely mixed or not, thus further detracting from the attainment of maximum expansion. Moreover conventional foam nozzles usually have not been adapted to use for purposes other than the generation of a foam spray. Accordingly, where straight water streams or fog are required, it has been necessary to employ additional pieces of equipment.

It is therefore an object of the present invention to provide a nozzle capable of discharging a slurry of several constituents mixed in the nozzle, the flow rate of one constituent entering the nozzle being controlled in a predetermined proportion to the flow rate of another constituent passing therethrough.

It is another object of the present invention to provide a foam nozzle wherein the flow of air is controlled in proportion to the velocity of water and liquid foam mixture and complete mixing of the air therewith occurs prior to discharge, to the end of obtaining optimum-desirable maximum foam expansion.

Another object of the invention is the provision of a foam nozzle which may be selectively employed to generate straight water streams and fog in addition to foam sprays.

Still another object of the invention is to provide an aeration chamber in a foam nozzle which has a venturi controlled air intake.

It is yet another object of the invention to provide expanded foam producing means of the class described which may be readily incorporated at substantially any point within the vertically and horizontally swivelable barrel of a hydraulic nozzle.

A further object of the invention contemplates the provision of a foam spray aeration chamber in a swivel joint including a two-piece venturi built into the joint with the respective pieces rotatable with the relatively rotatable portions of the joint.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIGURE 1 is a top plan view of a preferred embodiment of the nozzle.

FIGURE 2 is an elevational view of this embodiment.

FIGURE 3 is a diametric sectional view on an enlarged scale of the aeration chamber of the nozzle.

FIGURE 4 is a sectional view taken at line 4—4 of FIGURE 3.

Figure 5:
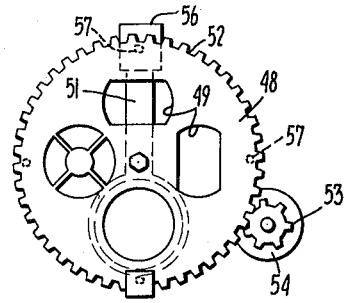
FIGURE 5 is a front face view of the spray selector means of the nozzle.

Considering now the nozzle in some detail and referring to the illustrated forms thereof in the drawings, there will be seen to be generally provided a combining chamber of unique design which is disposed in communication with a flow barrel at a substantial distance from its outlet end. The chamber is provided with a venturi which is in coaxial alignment with the flow path through the barrel. A converging section is formed in the chamber to direct water or other liquid under high pressure coaxially through the venturi and along the flow path through the barrel towards its outlet end. There are further included means for selectively opening and closing ports to the chamber in the region annularly between the converging section and entrance of the venturi. Thus when the ports are open, various materials such as air are sucked into the chamber and into the venturi by virtue of the vacuum created by the high pressure liquid directed therethrough. The amount of sucked in material is, of course, proportional to the volume and velocity of the liquid flow through the venturi. Thus the amount of air or other sucked in material is continuously regulated in a substantially constant proportional relation to the volume flow rate of high pressure liquid by venturi action. The stream discharged from the outlet of the nozzle is thus a mixture of the liquid and sucked in material combined in a predetermined fixed proportion. The mixed constituents discharged may be in the form of a slurry such as expanded foam.

Where the nozzle is employed to produce expanded foam such as in the specific embodiment of a foam nozzle illustrated in the drawings and subsequently described in detail herein, the combining chamber functions as an aeration chamber, air being the material sucked into the ports, and water and liquid foam are directed under pressure through the venturi. The characteristics of the venturi are selected such that the proportion of sucked in air in the liquid stream entering the regions of the barrel ahead of the venturi is commensurate with desired optimum expansion of the liquid foam. The substantial length of barrel provided ahead of the venturi, moreover, enables the air to be thoroughly mixed with the liquid foam and water before the mixture emanates from the barrel outlet, this further contributing to the desired complete foam expansion. In addition, the foam nozzle preferably includes an orifice selector at the barrel outlet to change the pattern of the discharge stream as well as to control the diameter of the discharge in predetermined relation to the flow of mixture through the venturi. More particularly, in this latter regard the size of the discharge orifice may be selected such that discharge will not occur at a greater rate than is required to allow complete beating up of the mixture in the barrel for the particular flow rate through the venturi. In other words, the foam contents may be held in the barrel for a sufficient time to insure complete mixing while just enough discharge occurs from the barrel to maintain flow through the venturi and suction of air. Finally, when the ports to the aeration chamber are closed, solid stream flow through the barrel results. The diameter of the solid stream flow may be varied by means of the orifice selector. Also the orifice selector facilitates variation of the discharge pattern to produce for example a fog.

As regards the detailed structure of the foam nozzle, it is to be noted with reference to FIGURES 1 and 2 that the nozzle, as illustrated and subsequently described herein, is embodied in a tortuous vertically and horizontally swivelable barrel 11 of the type disclosed in my prior patent No. 2,612,502 in connection with a hydraulic giant. It is to be noted, however, that although this form of barrel is preferred in the construction of the nozzle, the principles of the invention are equally as applicable to other barrel configurations such as straight.

Briefly as regards the preferred tortuous barrel 11, same includes a vertical tubular base section 12 having a flange 13 at its lower end and terminating at its upper end in a ring swivel joint portion 14. A complementary swivel joint member or ring 16 is mounted in operative relation upon the portion 14 and secured to one end of a tubular 45° elbow 17 which extends upwardly therefrom. A 90° elbow 18 is in turn secured to elbow 17 to extend upwardly in alignment therewith and thence horizontally outward at right angles therefrom. The outer end of elbow 18 is secured through a swivel joint 19 to a 90° elbow 21 which extends outwardly from the joint and thence right angularly from the joint axis. Several additional elbows and straight tubular members are joined to define a 180° barrel section 22 which is secured to elbow 21. The plane of the elbow 21 is inclined to the plane of the 180° section 22 and the center line of the latter in a region beyond the 180° of curvature is disposed to overlie the axis of the swivel joint defined by members 14, 16. Finally an upwardly extending 45° elbow 23 is preferably secured to the end of section 22 to define the outlet end of the barrel. The function and advantages of the tortuous form of barrel 11 are fully set forth in the Patent 2,612,402 and accordingly are not detailed herein. From the standpoint of the concept of the present invention it suffices to state that a relatively long flow path is defined by the tortuous barrel while all of the advantages peculiar to such configuration are retained in the instant foam nozzle.

Considering now the combining or aeration chamber of the nozzle, such chamber is generally designated herein by the numeral 24. It will be appreciated that chamber 24 may be variously placed relative to barrel 11, however, in the particular embodiment now to be described in detail, the chamber is disposed prior to the base section 12 such that the entire flow path of the barrel is interposed between the chamber and the barrel discharge end. More particularly, it is to be noted that in the present case the chamber is defined by a generally inverted funnel shaped housing 26 including an upper section 27 and an enlarged downwardly and outwardly tapered lower section 28. The upper section 27 is provided with a flange 29 to facilitate connection to flange 13 of the base section of the barrel. The lower section 28 is formed with an inwardly turned annular end face 31 defining a central opening 32. A circular mounting plate 33 is secured to the end face 31 as by means of bolts 34, such plate having a central boss 36 which concentrically fits within opening 32. An internally threaded recess 37 is formed centrally of the boss and such recess terminates in a bore 38 extending through the plate and defined by a depending exterior collar portion 39 thereof. The collar portion facilitates connection to a penstock or supply pipe 41 through which water in combination with liquid foam is introduced under pressure. The converging section of previous mention is then preferably provided as a nozzle shaped member 42 which is externally threaded as indicated at 45 for securance within threaded recess 37. When thus mounted the bore of nozzle member 42 is coaxial with bore 38 and the discharge end of the nozzle member is adjacent the lower end of the upper housing section 27 and spaced radially inward therefrom. Thus the liquid supplied from the pipe 41 is discharged from the nozzle member coaxially through the upper housing section 27 and into the barrel 11. The inner wall of such housing section 27 moreover is appropriately contoured to define the venturi of previous mention, which in the present embodiment is designated by the numeral 43.

The means for selectively opening and closing ports to the chamber 24 may of course be variously provided. In the present embodiment such means include circumferentially spaced bores 44 formed in the housing end face 31 and centrally communicating with smaller diameter bores 46 provided in the mounting plate 33. Clapper valve members 47 are hingedly secured to the end face 31 respectively adjacent the bores 44 so as to be pivotally movable between closed positions in sealing engagement with the bores and open positions out of engagement therewith. The valve members 47 are pivoted to swing to their open positions in response to suction created in the chamber by liquid flowing at high velocity through the venturi 43. Air thus is sucked through the open ports and into the liquid stream passing through the venturi in proportion to the volume and velocity of the liquid. However, when the liquid flow rate relative to the barrel outlet diameter and length is such as to establish a static load and back pressure in the chamber, such pressure is effective in closing the clapper valve members. The passage of air into the chamber is hence blocked and a solid liquid stream is transmitted through the nozzle barrel 11. Desirably the effective size of the bores 44 may be adjusted by means of the screw 50 which may be positioned to limit the opening movement of the valves 47.

Considering now the orifice selector for varying the diameter and pattern of the discharge from the outlet of the barrel, such selector preferably comprises a selector disc 48 rotatably mounted at the barrel outlet and having circumferentially spaced orifices 49 of varied size and configuration which are registerable with the barrel bore. More particularly, a bracket 51 projects radially from elbow 23 adjacent its discharge end. The disc 48 is journalled upon bracket 51 in eccentric relation to the elbow axis at its discharge end. The orifices 49 are then disposed along a circle of centers having a radius equal to the eccentricity. Preferably the disc is arranged for remotely controlled driven rotation. To this end the disc periphery may be, for example, toothed as shown at 52 and the teeth meshed with a gear 53 secured to the drive shaft of a removable electric motor 54 mounted upon the barrel elbow 23. A normally closed limit switch 56 may be mounted upon the bracket 51 with the actuator of the switch disposed to be engageable with indexing detents 57 formed on the back face of the disc at circumferentially spaced increments corresponding to those of the orifices. The switch 56 may be paralleled with a remotely disposed push button switch or the like (not shown) connected between the motor 54 and a power source. Thus with one of the detents 57 in engagement with the actuator of switch 56 and thereby maintaining same open, the push button may be momentarily depressed to apply power to the motor. The motor in turn effects rotation of the disc to move the detent out of engagement with the switch actuator whereby the switch is closed to maintain current flow between the source and motor even after the push button is opened. When the next detent engages the switch actuator the switch opens to hence remove power from the motor and terminate rotation of the disc. At this time the orifice corresponding to the particular detent is in registry with the outlet end of the barrel. Thus a number of orifices of varied size and configuration may be positioned at the outlet end of the barrel by remote control to vary the discharge characteristics.

Figure 6:
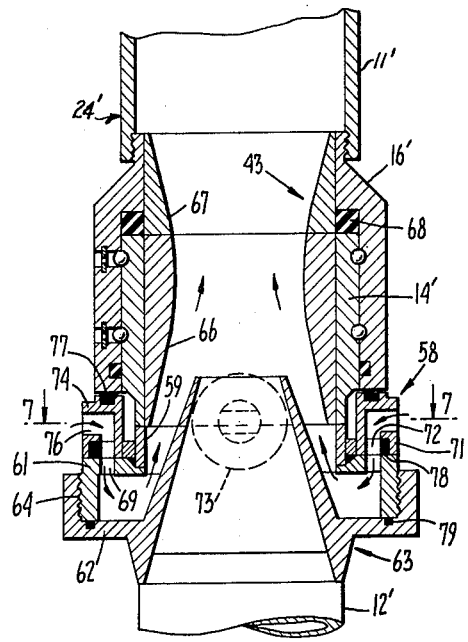
FIGURE 6 is a view similar to FIGURE 3, but illustrating a modified form of aeration chamber which may be employed in the nozzle.
Figure 7:
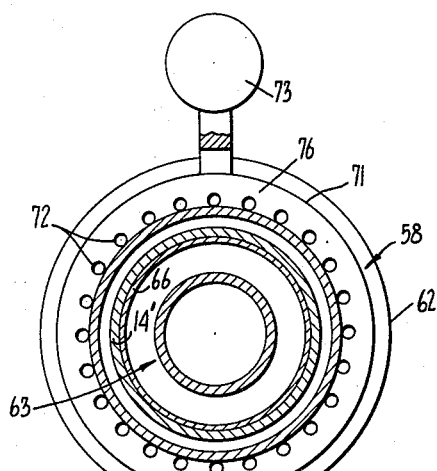
FIGURE 7 is a sectional view taken at line 7—7 of FIGURE 6.

A modified arrangement of the aeration chamber 24 is illustrated in FIGURES 6 and 7. In this arrangement the chamber designated 24' in the drawings is incorporated in the swivel joint defined by joint members 14', 16' of the barrel 11' and a manually adjustable valve means 58 is employed in place of the clapper valve means of the previous embodiment for the selective admission of air to the chamber. More particularly the inner swivel ring 14' is formed with a depending sleeve 59 which is coaxial with the ring bore. The lower end of the sleeve is provided with an outwardly stepped cupped base portion 61. A complementary cylindrical flange 62 of a nozzle shaped member 63 concentrically engages the periphery of base portion 61 and is in threaded attachment therewith as shown at 64. The lower end of the nozzle member is communicably connected to the base section 12' of the barrel which is in turn arranged for attachment to the water supply 41. The upper end of the nozzle member is disposed in inwardly spaced concentric relation to the sleeve 59 of the swivel ring 14'. It is now particularly important to note that the venturi 43 is incorporated in the swivel joint as two relatively rotatable portions 66, 67. More particularly venturi portion 66 is concentrically secured within the swivel ring 14' to be coterminous with its upper end. The venturi portion 67, on the other hand, is concentrically secured within the upper end of the outer swivel ring 16' and is in rotatable end abutment with venturi portion 66 to define a continuous venturi passage therewith. Thus as the swivel rings 14', 16' are rotated relative to each other, so are the venturi portions 66, 67. In order to prevent leakage at the juncture of the venturi portions, a seal ring 68 or the like is provided thereat mounted between the inner and outer swivel rings.

As regards the manually adjustable valve means 58 it is to be noted that the outwardly stepped shoulder of base portion 61 is provided with a plurality of circumferentially spaced apertures 69 in communication with the annular space defined between the nozzle member and the lower end of the venturi. An annular gate plate 71 provided with correspondingly spaced apertures 72 is concentrically and rotatably disposed about the swivel ring sleeve 59 in superposed relation to the base portion shoulder. Thus the gate plate may be rotated to selectively open or close passage through the apertures 69 by disposing the apertures 72 in or out of registry therewith. To facilitate such rotation, a radially extending operating handle 73 is secured to the gate plate and may be moved to also position the apertures in various partially registered relations. In addition, the gate plate is preferably formed with an upstanding outwardly flared collar 74 which is spaced from the plate surface to define therewith an annular side opening air passage 76 in communication with the apertures 72. The collar, moreover, rotatably abuts the lower end of swivel ring 16' and a seal ring 77 is interposed therebetween. Additional seal rings 78, 79 are placed between the gate plate and shoulder outwardly of the apertures 69, 72 and between the base portion 61 and nozzle member flange 62 to prevent air leakage.

Thus with the gate plate 71 rotated to open or partially open position air is sucked into the aeration chamber by the water and liquid foam mixture flowing from the nozzle member through the venturi in the swivel joint in a similar manner to that previously described. The air is mixed with the water liquid foam mixture to effect complete expansion of the foam in the barrel prior to its discharge from the outlet end. When the gate plate is rotated to closed position to block the intake of air, the water-liquid foam mixture is of course discharged through the barrel as a solid stream.

Figure 8:
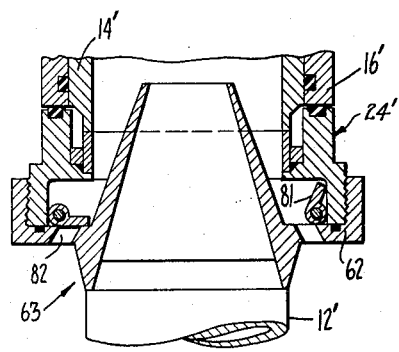
FIGURE 8 is a view similar to FIGURE 6, but illustrating a further modified form of the aeration chamber.

It will be appreciated that the swivel joint aeration chamber arrangement of FIGURES 6 and 7 may employ a clapper valve air inlet means in place of the manual valve means 58. More particularly clapper valves 81 may be provided as depicted in FIGURE 8 to control the passage of air through ports 82 formed in the nozzle member flange 62. Operation of the clapper valves 81 is identical to that described relative to the clapper valves 47 of the embodiment of FIGURES 1–5.

While the apparatus of my invention has been particularly described for use in connection with a foam spray, it is to be noted as mentioned previously that the apparatus may be utilized in connection with the foamation of other components, such as various fluids, and streams containing various proportions of solid, or even streams of dry products.

What is claimed is:

1. A nozzle of the character described comprising a discharge barrel, a supply pipe for water under pressure and liquid foam mixture, means connected to said pipe introducing water under pressure and liquid foam mixture thereto, means defining a chamber in communication with and interposed between said barrel and supply pipe being at a distance many times its length from the outlet end of the barrel, a venturi in said chamber in coaxial communication with the flow path through said supply pipe and barrel, a forwardly converging section in said chamber disposed to direct flow coaxially through said venturi in the direction of said outlet end, means defining air supply ports to said chamber whereby air sucked through said ports into said chamber by venturi action is mixed with the discharge through the venturi in proportion to the volume and velocity thereof, and means operatively associated with the ports movable to close same or to open the ports for admission of air to the chamber.

2. A nozzle according to claim 1, further defined by orifice selector means at the outlet end of said barrel for selectively varying the rate of flow of the water and air mixture through the barrel, and said barrel comprising a series of communicating pipe sections angularly related to one another whereby a substantially continuous tortuous flow path will be provided for the mixture between the chamber and the barrel outlet.

3. A nozzle comprising a barrel for the flow of high pressure water and liquid foam mixture therethrough, means defining an aeration chamber in coaxial communication with the flow path through said barrel at a distance many times the length of the chamber from the outlet end of the barrel, said chamber having ports for the admission of air, a converging section in coaxial communication with the flow path through said barrel for directing the flow coaxially through said chamber towards the outlet end of said barrel, means connected to said converging section introducing high pressure water and liquid foam mixture thereto, and a venturi coaxially disposed in said chamber to receive the flow from said converging section, said venturi having flow characteristics to suck a predetermined amount of air through said ports in a substantially fixed predetermined proportion to the flow volume and velocity of said water and liquid foam mixture commensurate with maximum expansion of the foam, and valve members mounted within the chamber movable to and between positions in closed engagement with said ports and out of operative engagement therewith.

4. A nozzle comprising a tortuous barrel including a vertical base section connected by a vertical swivel joint to a series of pipe sections angularly related to one another, a generally invert funnel shaped housing having an upper section coaxially communicably connected to said base section and a downwardly and outwardly tapered lower section with an inwardly turned annular lower end face, a nozzle member secured within said end face and coaxially extending therefrom to a point adjacent the juncture of the upper and lower sections of said housing and forming with the housing an annular space therebetween, said nozzle member adapted for communicable connection to a source of high pressure liquid, means defining a venturi coaxially within the upper section of said housing, and means defining a plurality of circumferentially spaced air ports in said end face of said housing and leading to said space.

5. A foam nozzle according to claim 4, further defined by an orifice selector disc mounted at the outlet end of said barrel for rotation about an axis eccentrically related to that of the barrel outlet, said disc having circumferentially spaced orifices of varied size and configuration selectively registerable with the outlet upon rotation of the disc, and remotely controlled means coupled to said disc for effecting rotation thereof.

6. A foam nozzle according to claim 4, further defined by means operatively associated with the air ports movable to close same or to open said air ports.

7. A foam nozzle according to claim 6, wherein said means operatively associated with the air ports comprises clapper valve members pivotally mounted upon the end face of said housing interiorly thereof and movable between positions in and out of closed engagement with said ports.

8. A foam nozzle according to claim 7, further defined by an orifice selector disc mounted at the outlet end of said barrel for rotation about an axis eccentrically related to that of the barrel outlet, said disc having circumferentially spaced orifices of varied size and configuration selectively registerable with the outlet upon rotation of the disc, and remotely controlled means coupled to said disc for effecting rotation thereof.

9. A foam nozzle comprising a tortuous barrel including a vertical swivel joint coupled to an upwardly and outwardly turned horizontal section in turn connected by a horizontal swivel joint to a 270° section extending directly over and forwardly of the axis of said vertical swivel joint to an outlet end, said vertical swivel joint including an inner swivel ring member and complementary outer swivel ring member rotatable relative thereto, said inner ring member having a depending sleeve coextensive with its bore, said sleeve having an outwardly stepped cupped base portion, a nozzle member having a cupped cylindrical flange concentrically secured to said base portion, said nozzle member adapted for communicable attachment to a high pressure liquid source, a pair of venturi portions respectively concentrically secured within said inner and outer swivel ring members and defining a continuous venturi through said vertical swivel joint, said venturi portions rotatable relative to each other, and means for selectively admitting air to said vertical swivel joint concentrically about said nozzle member.

10. A foam nozzle according to claim 9, further defined by said means for selectively admitting air comprising means defining a plurality of circumferentially spaced apertures in the shoulder of said outwardly stepped cupped base portion of said sleeve, and an annular gate member concentrically rotatably disposed about said sleeve in sealed superposed relation to said shoulder, said gate member having a plurality of circumferentially spaced apertures correspondingly registerable with the apertures in said shoulder.

11. A nozzle in accordance with claim 1, further defined by said port closing and opening means being operable to selectively vary the effective area of the ports and formed to maintain the ports in the closed or selected effective area.

12. A nozzle according to claim 1, further defined by said means operatively associated with the ports movable to close same or to open the ports for admission of air to the chamber being automatically operable between closed and open conditions in accordance with the pressure in said chamber.

13. A foam nozzle comprising a tortuous barrel including a vertical swivel joint coupled to an upwardly and outwardly turned horizontal section in turn connected by a horizontal swivel joint to a 270° section extending directly over and forwardly of the axis of said vertical swivel joint to an outlet end, said vertical swivel joint including an inner swivel ring member and complementary outer swivel ring member rotatable relative thereto, a pair of venturi portions respectively concentrically secured within said inner and outer swivel ring members and defining a continuous venturi through said vertical swivel joint, said venturi portions being thereby rotatable relative to each other, a nozzle member having an outwardly flared cupped cylindrical flange secured to said inner ring member, said nozzle member adapted for communicable attachment to a high pressure liquid source, said flange having a plurality of circumferentially spaced apertures, and a plurality of clapper valve members pivotally mounted upon the interior face of said flange adjacent said apertures, said clapper valve members pivotally movable into and out of closing engagement with said apertures.

References Cited by the Examiner

UNITED STATES PATENTS

| | | | |
|---|---|---|---|
| 159,142 | 1/75 | Baird. | |
| 573,014 | 12/96 | Lee | 103—276 |
| 692,375 | 2/02 | Snider | 239—392 |
| 881,548 | 3/08 | Claflin | 230—92 |
| 1,526,179 | 2/25 | Parr et al. | 230—92 |
| 1,964,807 | 7/34 | Baum | 239—394 |
| 2,089,646 | 8/37 | Friedrich | 169—15 |
| 2,405,375 | 8/46 | Smith | 239—407 |
| 2,567,638 | 9/51 | Francois | 103—260 |
| 2,664,912 | 1/54 | White | 137—211 |
| 2,685,297 | 8/54 | Clearman | 137—211 |
| 2,760,821 | 8/56 | Kenney | 239—335 |
| 2,868,301 | 1/59 | Wiedorn | 169—15 |
| 2,891,913 | 6/59 | Welford | 239—311 |
| 2,986,344 | 5/61 | Knight | 239—587 |
| 2,988,343 | 6/61 | Edwards et al. | 169—15 |
| 2,990,165 | 6/61 | Joseph | 169—15 |
| 2,998,199 | 8/61 | Miscovich | 239—587 |
| 3,045,897 | 7/62 | Wood | 230—92 |

FOREIGN PATENTS

| | | |
|---|---|---|
| 15,243 | 1881 | Germany. |
| 17,649 | 1882 | Germany. |
| 30,127 | 10/07 | Austria. |
| 915,043 | 7/46 | France. |

EVERETT W. KIRBY, *Primary Examiner.*

EDWARD J. MICHAEL, LOUIS J. DEMBO,
*Examiners.*